Nov. 13, 1951     E. ALLEN     2,574,947
LAWN TRIMMER
Filed Aug. 16, 1948
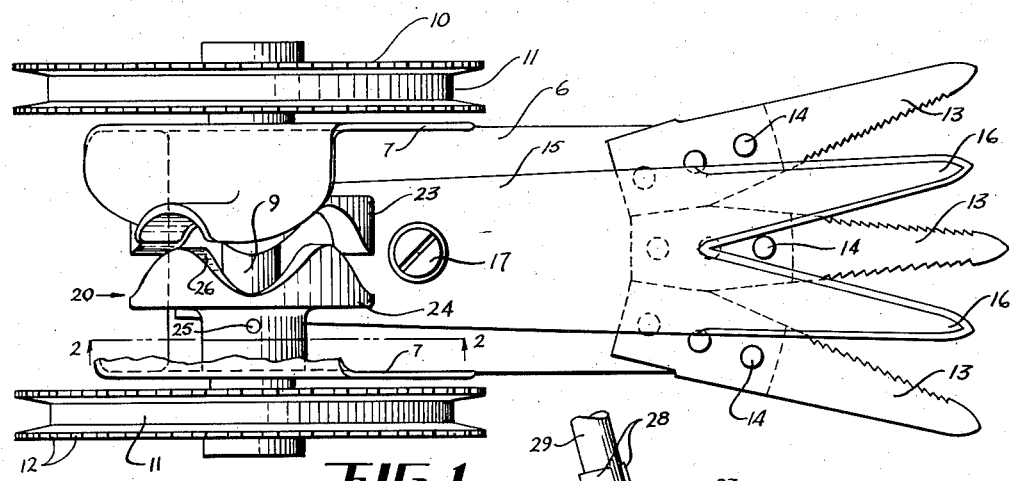
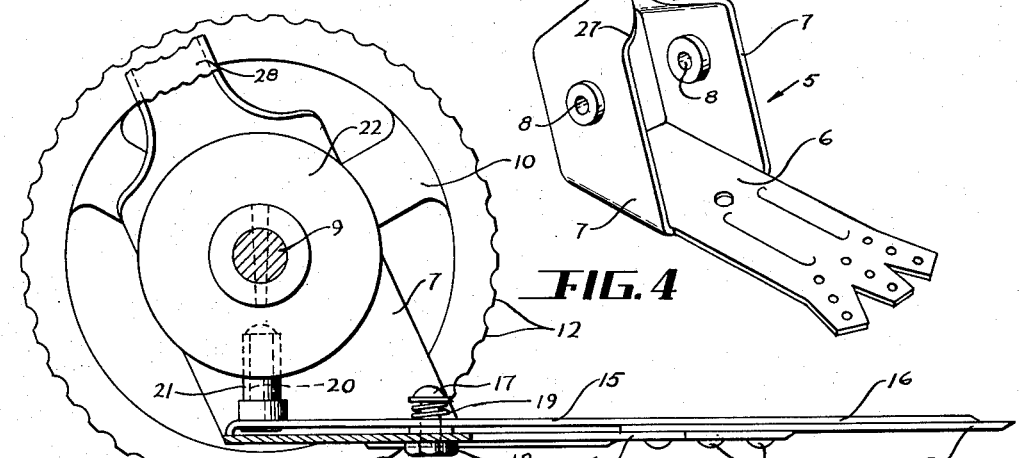
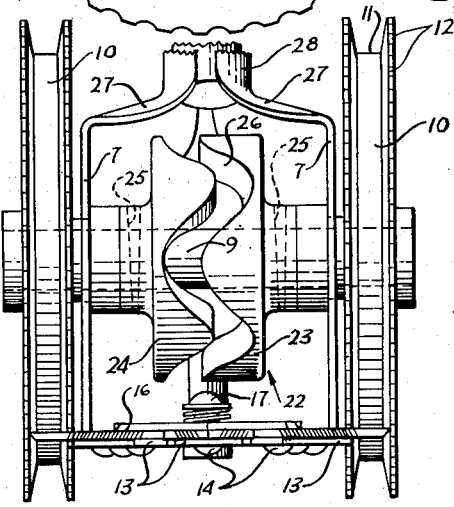
INVENTOR.
ERHARD ALLEN
BY
ATTORNEY Patented Nov. 13, 1951

2,574,947

UNITED STATES PATENT OFFICE 2,574,947

LAWN TRIMMER

Erhard Allen, Dayton, Ohio; Helen Agnes Allen, executrix of said Erhard Allen, deceased, assignor to Helen Agnes Allen Application August 16, 1948, Serial No. 44,479

2 Claims. (Cl. 56—246)

This invention relates to a lawn trimmer and one object of the invention is to provide a lawn trimmer of a strong durable construction which can be produced at a relatively low cost and which can be easily manipulated.

A further object of the invention is to provide such a lawn trimmer with a supporting structure or frame of simple but strong construction which is supported by traction wheels and provides firm support for the cutting elements and their operating devices.

A further object of the invention is to provide a frame which can be formed from a single piece of sheet metal at a low cost.

A further object of the invention is to provide a lawn trimmer in which the cutter actuating cam is of such character and so arranged that it does not contact with or pick up dirt, grass cuttings or the like.

Other objects of the invention may appear as the device is described in detail.

In the accompanying drawings Fig. 1 is a top plan view of a lawn trimmer embodying my invention; Fig. 2 is a side elevation partly in section on the line 2—2 of Fig. 1; Fig. 3 is a front elevation of the lawn trimmer with the handle broken away; and Fig. 4 is a perspective view of a supporting frame.

In these drawings I have illustrated the preferred embodiment of my invention but it is to be understood that the lawn trimmer as a whole, as well as the several parts thereof, may take various forms without departing from the spirit of the invention.

In the particular construction here illustrated the trimmer comprises a supporting frame 5 having a bottom or base member 6 and side members 7 which extend upwardly from the respective lateral edges of the base member and are preferably slightly inclined in a rearward direction. The side members are provided with alined bearings 8 in which is rotatably mounted a shaft 9, the end portions of which project outwardly beyond the side members 7. Traction wheels 10 are drivingly connected with the shaft on the outer sides of the respective side members of the frame and preferably the wheels are rigidly secured to the respective end portions of the shaft. The wheels may be provided with traction surfaces of any suitable character and in the present instance each wheel is provided with a circumferential groove 11 and the flanges on the opposite sides of that groove are provided with spaced teeth 12 to resist the slipping of the wheel on the surface of the lawn. The wheels being mounted on the outer sides of the frame are spaced a substantial distance one from the other and thus strongly resist a tendency of the trimmer to tilt about an axis transverse to the shaft.

The base member 6 of the frame projects forwardly beyond the side members of the frame a substantial distance and is provided at its forward end with forwardly extending and diverging cutter teeth 13. Thus the base member and its teeth constitute a stationary cutting element. The cutter teeth may, if desired, be formed integral with the base member but preferably they are formed separately therefrom and rigidly secured thereto, as by rivets 14 the upper ends of which are flush with the upper surface of the base member. Connected with the base member for oscillating movement with relation thereto is a cutting element 15 which, in the form shown, comprises an elongate body portion having rigidly secured to the forward end thereof, and in the present instance formed integral therewith, a plurality of cutter teeth 16 arranged to cooperate with the cutter teeth 13 of the base member. This movable cutting member may be arranged in any suitable relation to the stationary cutting element, or base member 15. Preferably it is arranged above and in supporting engagement with the stationary cutting element and is pivotally connected therewith for movement about a vertical axis between the ends thereof. The movable cutting element may be connected with the stationary cutting element in any suitable manner and in the arrangement shown a pivot pin, such as a bolt 17, extends through alined openings in the two cutting elements and is retained therein by a nut 18. The bolt is of a length somewhat greater than the combined thickness of the two elements and a coil spring 19 is interposed between the head of the bolt and the movable cutting element to press the cutter teeth of the latter into firm engagement with the cutter teeth of the stationary cutting element. Oscillatory movement is imparted to the movable cutting element by cam means actuated by the traction wheels. The cam means may take various forms and the cutting element may be connected therewith in any suitable manner. Preferably the cutting element 15 is provided in the rear of its pivotal axis with an upwardly extending stud 20, here shown as arranged directly below the shaft 9 and provided with an antifriction roller 21. The cam is preferably of the rotatable type having a circumferential cam groove into which the stud 20 extends. In the present instance the cam is shown at 22 as comprising two spirally spaced parts 23 and 24 rigidly secured to the shaft 9, as by pins 25, and provided with opposed cam surfaces forming between the same a circumferential cam groove 26 into which the stud 17 extends. The cam may be provided with any desired number of lobes to cause any desired number of cutting movements of the oscillating cutting element upon each rotation of the cam.

It will be noted that the cam is of a diameter substantially less than the diameters of the traction wheels and inasmuch as the cam and the wheels rotate about the same axis this results in that surface of the cam which is lowermost being spaced above the surface of the lawn such a distance that it will not have contact with the lawn and will not pick up dirt, grass cuttings or the like, which otherwise might enter the same and interfere with the proper operation of the trimmer.

The trimmer may be propelled in any suitable manner but usually it is manually propelled by a handle which is preferably connected with the supporting frame. In the construction shown the upper portions of the side members 7 of the frame extend inwardly as shown at 27 and are provided with upwardly extending opposed portions 28, which in the present instance are rearwardly inclined. The opposed portions 28 of the side members are preferably curved to provide the same with channels to receive the lower end portion of a propelling handle 29 and are rigidly secured to the handle, as by means of a pin 30. Thus the upper ends of the side members are rigidly connected one with the other and with the handle. It will be apparent that the frame is of such a character that it may be formed from a single piece of sheet metal by simple blanking and forming operations.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a lawn trimmer, a frame comprising upright side members having alined bearings, a base member between and rigidly connected with the lower portions of said side members and extending forwardly a substantial distance beyond said side members, the upper portions of said side members having inwardly extending parts shaped to receive and support between them the end portion of a propelling handle, a shaft rotatably supported in said bearings, ground wheels drivingly connected with said shaft on the outer sides of the respective side members of said frame, a cam member rigidly secured to said shaft between said side members, stationary cutter teeth secured to and diverging forwardly from the forward end of said base member, and an elongate cutting element mounted between its ends on said base member for movement about a vertical axis, having at its forward end cutting teeth to cooperate with said stationary cutting teeth and having at its rear end a part engaging and actuated by said cam to impart oscillatory movement thereto about said vertical axis.

2. In a lawn trimmer, a frame comprising upwardly and rearwardly inclined side members having alined bearings, and a horizontal base member rigidly connecting the lower portions of said side members one with the other, a shaft journaled in said bearings, ground wheels rigidly secured to said shaft on the outer sides of the respective side members and extending below said base member, said base member extending forwardly a substantial distance beyond said wheels, forwardly extending laterally spaced cutting teeth secured to the forward end of said base member, an elongate cutting element mounted between its ends on said base member for movement about a vertical axis adjacent the forward lower corners of said side members and having in the rear of said axis a cam engaging part, a cam rigidly secured to said shaft between said side members and having a periferal cam groove to receive said cam engaging part of said elongate element, and a propelling handle connected with said frame.

ERHARD ALLEN.

REFERENCES CITED

The following references are of record in the file of this patent:

UNITED STATES PATENTS

| Number | Name | Date |
|---|---|---|
| Re. 13,463 | Karcher | Aug. 27, 1912 |
| 33,578 | Doudna | Oct. 20, 1861 |
| 72,722 | Cooke | Dec. 31, 1867 |
| 208,355 | Wright | Sept. 4, 1878 |
| 370,771 | Fitzgerald | Oct. 4, 1887 |
| 887,461 | Card | May 12, 1908 |
| 953,541 | Montgomery | Mar. 29, 1910 |
| 1,057,015 | Stover | Mar. 25, 1913 |
| 1,860,316 | Clark | May 24, 1932 |
| 2,025,537 | Tauber | Dec. 24, 1935 |
| 2,151,413 | Woityneck | Mar. 21, 1939 |